(12) United States Patent
Das et al.

(10) Patent No.: US 10,558,507 B1
(45) Date of Patent: Feb. 11, 2020

(54) INBOUND TESTING TOOL

(71) Applicant: CERNER INNOVATION, INC., Kansas City, KS (US)

(72) Inventors: Arindam Das, West Bengal (IN); Sudipta Bhattacharjee, West Bengal (IN); Ankur Bhatia, West Bengal (IN)

(73) Assignee: Cerner Innovation, Inc., Kansas City, KS (US)

(*) Notice: Subject to any disclaimer, the term of this patent is extended or adjusted under 35 U.S.C. 154(b) by 28 days.

(21) Appl. No.: 15/856,579

(22) Filed: Dec. 28, 2017

(51) Int. Cl.
*G06F 3/00* (2006.01)
*G06F 9/44* (2018.01)
*G06F 9/46* (2006.01)
*G06F 13/00* (2006.01)
*G06F 9/54* (2006.01)

(52) U.S. Cl.
CPC .............. *G06F 9/546* (2013.01); *G06F 9/465* (2013.01)

(58) Field of Classification Search
CPC ...................................................... G06F 9/546
USPC ........................................................ 719/313
See application file for complete search history.

(56) References Cited

U.S. PATENT DOCUMENTS

| | | | |
|---|---|---|---|
| 8,117,042 B2 | 2/2012 | Braz et al. | |
| 9,779,209 B2 | 10/2017 | Greer | |
| 2005/0108057 A1* | 5/2005 | Cohen | G16H 40/20 705/3 |
| 2006/0129992 A1* | 6/2006 | Oberholtzer | G06F 11/3428 717/124 |

* cited by examiner

*Primary Examiner* — Timothy A Mudrick
(74) *Attorney, Agent, or Firm* — Shook, Hardy & Bacon, L.L.P.

(57) ABSTRACT

Methods, systems, and computer-readable media are disclosed herein for enabling inbound testing. Aspects herein provide a tool that can, from with a single application, generate test HL7 transaction messages and send the generated test HL7 messages to an inbound testing interface to monitor performance of a testing interface. The tool provides a mechanism to generate a large number of test HL7 messages having different identifier types and message types simultaneously. The tool also provides a mechanism to send large numbers of test HL7 messages, of different identifier types and message types, simultaneously, to a testing environment via multiple pipes.

20 Claims, 14 Drawing Sheets

INBOUND TESTING TOOL

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description and Drawings.

In brief and at a high level, this disclosure describes, among other things, methods, systems, and computer-readable media for enabling load testing for inbound messages for environments. As will be described, the present invention provides a tool to generate large volumes of test Health Level 7 (HL7) transaction messages and to, from within the same tool, transmit large volumes of test HL7 transaction messages to an inbound test interface utilizing multiple pipes at one time.

A computerized method is provided in an embodiment of the present invention. The computerized method comprises in a generation mode of a first application: accessing a client information source for generating test Health Level 7 (HL7) transaction messages; generating a plurality of test HL7 transaction messages, wherein generating the plurality of test HL7 transaction messages comprises: identifying a first identifier type for a first set of test HL7 transaction messages; and identifying a second identifier type for a second set of test HL7 transaction messages; output the first set of test HL7 transaction messages to a first destination; and output the second set of test HL7 transaction messages to a second destination; in a load testing mode of the application: identify a first message type of a first plurality of test HL7 transaction messages from the first set of test HL7 transaction messages for communication to an intermediary/intermediate agent via a first pipe; identify a second message type of a second plurality of test HL7 transaction messages from the second set of test HL7 transaction messages for communication to the intermediary agent via a second pipe; transmit each of the first plurality of test HL7 transaction messages and the second plurality of test HL7 transaction messages to the intermediary agent for translation to a format compatible with an inbound testing interface; and receive result data from the inbound testing interface indicating processing performance of the inbound testing interface.

Another embodiment provides one or more non-transitory computer-readable media having computer-executable instructions embodied thereon that, when executed, perform a method. The method comprises in a generation mode of a first application: access a client information source for generating test Health Level 7 (HL7) transaction messages; generate a plurality of test HL7 transaction messages, wherein generating the plurality of test HL7 transaction messages comprises: identifying a first identifier type for a first set of test HL7 transaction messages; and identifying a second identifier type for a second set of test HL7 transaction messages; output the first set of test HL7 transaction messages to a first destination; and output the second set of test HL7 transaction messages to a second destination; in a load testing mode of the application: identify a first message type of a first plurality of test HL7 transaction messages from the first set of test HL7 transaction messages for communication to an intermediary agent via a first pipe; identify a second message type of a second plurality of test HL7 transaction messages from the second set of test HL7 transaction messages for communication to the intermediary agent via a second pipe; transmit each of the first plurality of test HL7 transaction messages and the second plurality of test HL7 transaction messages to the intermediary agent for translation to a format compatible with an inbound testing interface; and receive result data from the inbound testing interface indicating processing performance of the inbound testing interface.

Yet another embodiment provides one or more non-transitory computer-readable media having computer-executable instructions embodied thereon that, when executed, perform a method. In accordance with the media, the method performed comprises generate a plurality of test HL7 transaction messages, wherein the plurality of test HL7 transaction messages includes at least a first identifier type and a second identifier type, wherein the first identifier type and the second identifier type are different from one another; output a first plurality of test HL7 transaction messages to a first destination associated with the first identifier type; output a second plurality of test HL7 transaction messages to a second destination associated with the second identifier type; identify a message type of each test HL7 transaction message of the first plurality of test HL7 transaction messages and the second plurality of test HL7 transaction messages for communication to an intermediary agent; and transmit each of the first plurality of test HL7 transaction messages a via a first pipe and the second plurality of test HL7 transaction messages via a second pipe to an intermediary agent for translation to a format compatible with an inbound testing interface.

BRIEF DESCRIPTION OF THE DRAWINGS

Embodiments are described in detail below with reference to the attached drawings figures, wherein.

DETAILED DESCRIPTION

Figure 1:
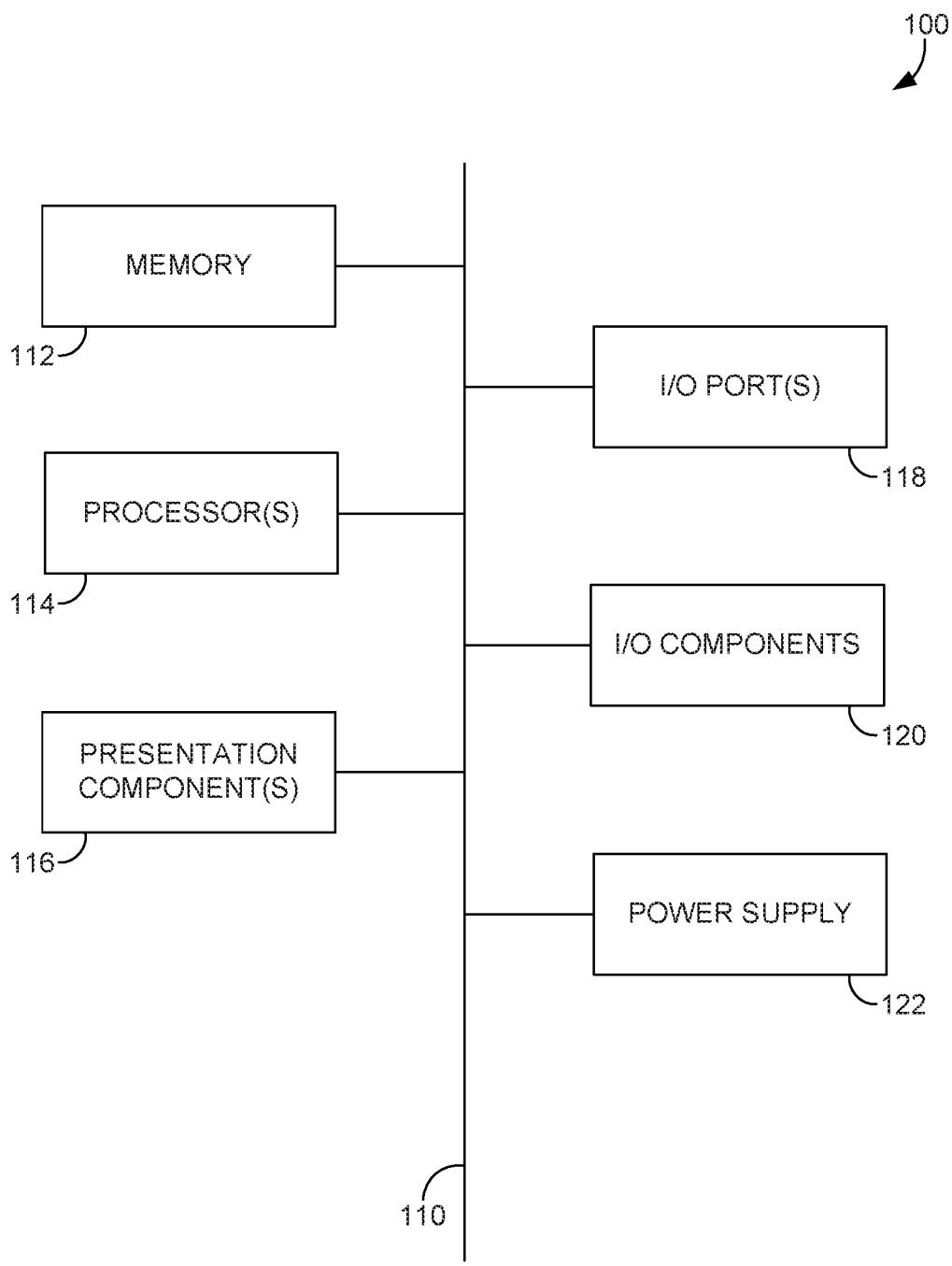
FIG. 1 is a computing device suitable for use in embodiments of the technology, in accordance with aspects described herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention enables load testing for inbound messages for environments. As will be described, the present invention provides a tool to generate large volumes of test HL7 transaction messages and to, from within the same tool, transmit large volumes of test HL7 transaction messages to an inbound test interface utilizing multiple pipes at one time. The logic of the tool is such that requested transactions are loaded into memory in chunks (e.g., 1000 transactions at a time) rather than loading all the requested transactions into memory at once. This optimizes the memory and performance of the tool. An exemplary default chunk size is 1000 but is configurable to any appropriate size.

A Health Level Seven (HL7) message is an example of an electronic data message. Health Level Seven (HL7) is an electronic data messaging protocol that enables messaging between applications across systems and that promotes interoperability between systems. Generally, HL7 messages encode electronic data using American Standard Code for Information Interchange (ASCII). An HL7 message comprises segments of related information. Each segment is independent of the other segments in an HL7 message, and segments may be optional or required depending on the type of HL7 message. The order of segments in an HL7 may vary depending on the type of HL7 message, as well. Segments are separated by carriage returns (e.g., <cr>, \r, or \x0D), generally. Each segment is labeled or identified with a header. Exemplary segment headers include MSH (i.e., a message header that conveys the metadata of the HL7 message), PID (i.e., patient identification), NK1 (i.e., next of kin), PV1 (i.e., patient visit), SCH (i.e., scheduling activity information), OBR (i.e., observation request), and/or OBXI (i.e., observation result). MSH headers are the headers that include the identifier type and message type of the HL7 messages.

An identifier type, as described herein and also known as an "event trigger", generally refers to a real-world event initiating communication of the HL7 message. Exemplary identifier types/event triggers are listed in the below Table 1. Table 1 is merely exemplary in nature and one of skill in the art will recognize that there are merely seven examples of many different event triggers.

TABLE 1

Exemplary Identifier Types/Event Triggers

| | |
|---|---|
| A01 | Admit |
| A02 | Transfer |
| A03 | Discharge |
| A04 | Register |
| A08 | Update patient information |
| A28 | Add person information |
| A31 | Update person information |

A message type, as used herein, is a three character code that generally refers to a purpose of a message for being sent. Some of the most common message types are illustrated in the below Table 2.

TABLE 2

Exemplary Message Types

| | |
|---|---|
| ACK | General Acknowledgement |
| ADT | Admit Discharge Transfer |
| DFT | Detailed Financial Transaction |
| MDM | Medical Document Management |
| MFN | Master Files Notification |
| ORM | Order |
| ORU | Observation result (unsolicited) |

An example of a version 2 HL7 message is shown below:

```
[MSH|^~\&|ADT|001||EATEST_SOURCE|201301300435||ADT^A08|00000000004127874|P|2.3
PID|1|987654111|44445367||PATIENT^Jessie^||19791016|M||7|333 Scrub TEST
AVE^^Malvern^PA^19355^USA|GL|(303)555-4499^610-555-1111|610-555-
1111|ENG|M|NP|111158493|128788787|9-87654^NC||003|CO
PD1|0001|||12345^Owen2^Test||||||||
NK1|1|Stwinklestar^Annie|EMC|333 Scrub TEST AVE^^Malvern^PA^19355^USA|^^^^^^
(303)555-4499|^^^^^610-555-1111|C
NK1|2|Stwinklestar^Annie|SEL|333 Scrub TEST AVE^^Malvern^PA^19355AUSA|^^^^^^
(303)555-4499|^^^^^610-555-1111|E|||ASST TEST ENGG|TEST|ZXX|
Cerner||||||||||||||||||^^^^^610-555-1111|123
OMNICELL DRIVE^^New York^NY^10021|||||
```

The top line of the above excerpt is the MSH header. As is shown, the MSH header includes "ADT^A08"—the message type and the identifier type/event trigger. This message can easily be identified as an Admit Discharge Transfer message to Update patient information. Similarly, ADT^A03 is known as a patient discharge message.

In the present invention, identifier types/event triggers may be identified as input in an HL7 generator and the message types may be identified as input in a load generator of the same application. Details of the HL7 generator and the load generator are discussed herein.

Turning to FIG. 1, an example computing device 100 is provided. Computing device 100 is one example of a suitable computing environment for practicing the technology, but is not intended to suggest any limitation as to the scope of use or functionality of the present technology. Neither should computing device 100 be interpreted as having any dependency or requirement relating to any one or combination of components illustrated.

In some cases, the technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With reference to FIG. 1, computing device 100 includes bus 110 that directly or indirectly couples the following devices: memory 112, one or more processors 114, one or more presentation components 116, input/output (I/O) ports 118, input/output components 120, and illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 1 and reference to "computing device."

With reference again to FIG. 1, computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion.

Figure 2:
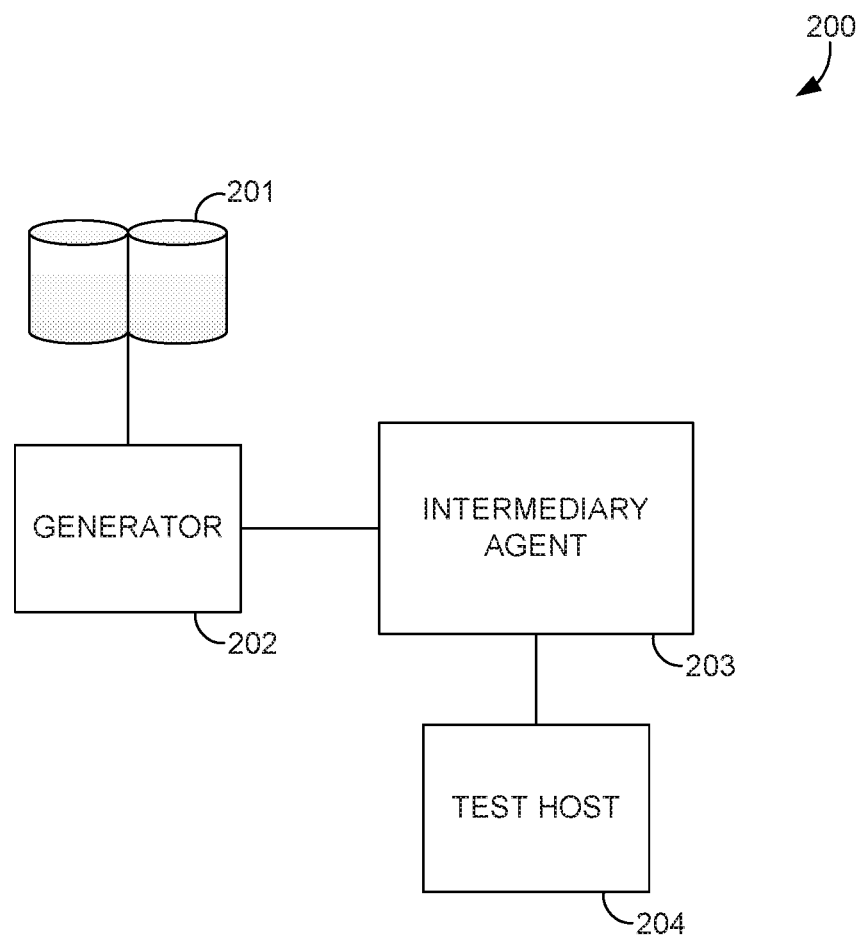
FIG. 2 is a block diagram of an exemplary system, in accordance with aspects described herein.

Turning now to FIG. 2, an exemplary system 200 in accordance with aspects described herein is provided. It will be understood that exemplary system 200 is provided as an example of an embodiment suitable for practicing this technology. Other arrangements of components (e.g., machines, interfaces, functions, orders, and groupings of functions, etc.) or sub-components can be used in addition to or instead of those shown, while some may be omitted from FIG. 2 for the sake of clarity.

With this in mind, exemplary system 200 is illustrated as having database 201, generator 202, intermediary agent 203, and test interface 204. The configuration of exemplary system 200 is not meant to imply a certain arrangement or distribution of components.

Database 201 generally stores information including data, computer instructions (e.g., software program instructions, routines, or services), and/or models used in aspects herein. Database 201 may comprise data memory. Database 201 may comprise client information including electronic health records (EHRs), patient information, etc. Although depicted as a single component, database 201 may be embodied as one or more data stores or may be in the cloud. Database 201 is the only limiting factor on how many test HL7 transaction messages may be generated, as described in further detail below.

Generator 202, in aspects herein, comprises two sub-components: an HL7 generator and a Load generator. The generator 202 may be used interchangeably with the "tool." The generator 202 allows the generation of test HL7 transaction messages and the transmission of test HL7 transaction messages from within a single application. Exemplary graphical user interfaces (GUIs) of the HL7 generator may be found in FIGS. 3-6. Exemplary GUIs of the load generator may be found in FIGS. 7-14.

The HL7 generator portion of the generator 202 generates test HL7 transaction messages for testing an inbound interface. Testing inbound message is difficult for several reasons including data scarcity. Data scarcity (e.g., insufficient availability of patient information) is a technological problem as there is insufficient data in order to satisfy testing requirements. For example, systems, in the real-world, often receive tens of thousands of messages within a given period of time. This large volume takes a toll on a system. Testing allows for performance analysis to see how a system is behaving under such circumstances. When there is a shortage of data, there's no way to simulate real-world environments as there isn't enough data for the simulation.

The generator 202 tool described herein accesses data from, for example, a client database. The test database may include available, scrubbed data including Encounter ID, Patient name, age, insurance details, health provider, etc. Based on the available data, the generator 202 may create test HL7 transaction messages by adding additional random data (e.g., email ID, phone number, address, insurance, etc.) to the data accessed from the test database. As the test database is scrubbed, in this example, no confidential information is present and will not be included in the generated transactions. Real data cannot be used for various confidentiality reasons, such as the Health Insurance Portability and Accountability Act (HIPPA). Patient information from client databases must remain confidential. This, again, leads to data scarcity. In the situation where the test database is not scrubbed then some portion of the data is real data and that gets randomized and duplicated by the generator 202.

Figure 3:
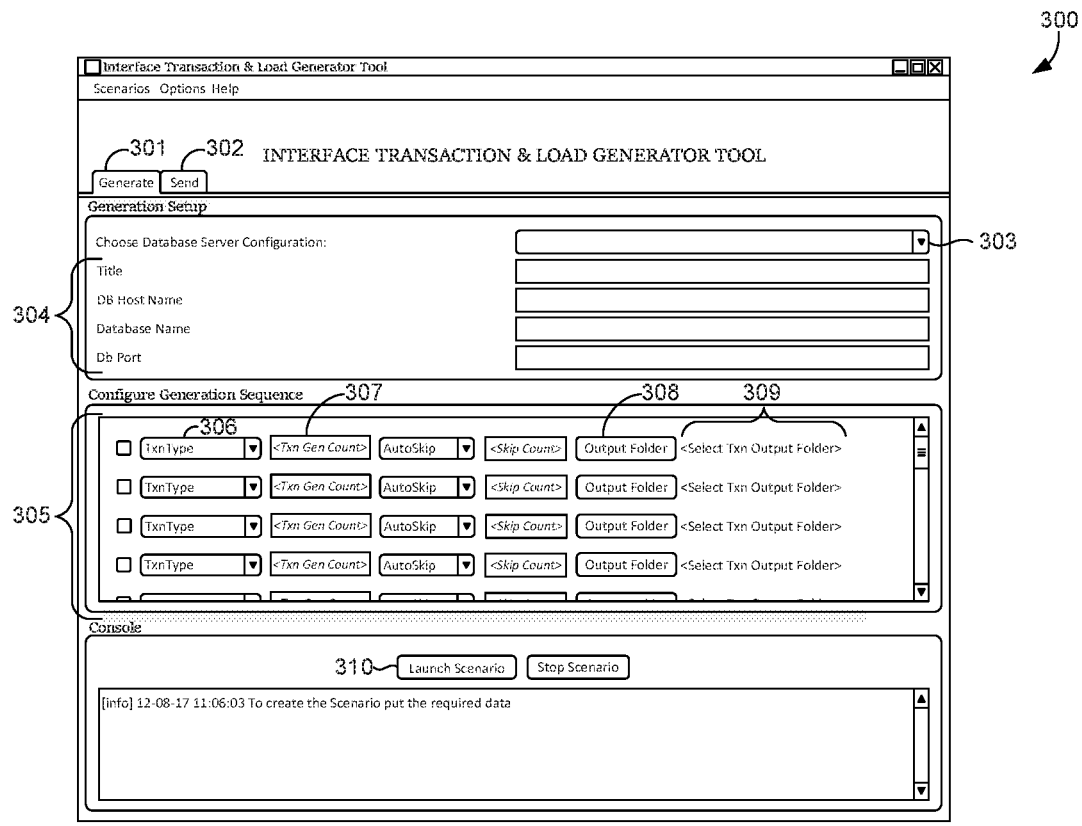
FIG. 3 depicts an exemplary graphical user interface (GUI) for initiating a new test scenario, in accordance with aspects described herein.
Figure 4:
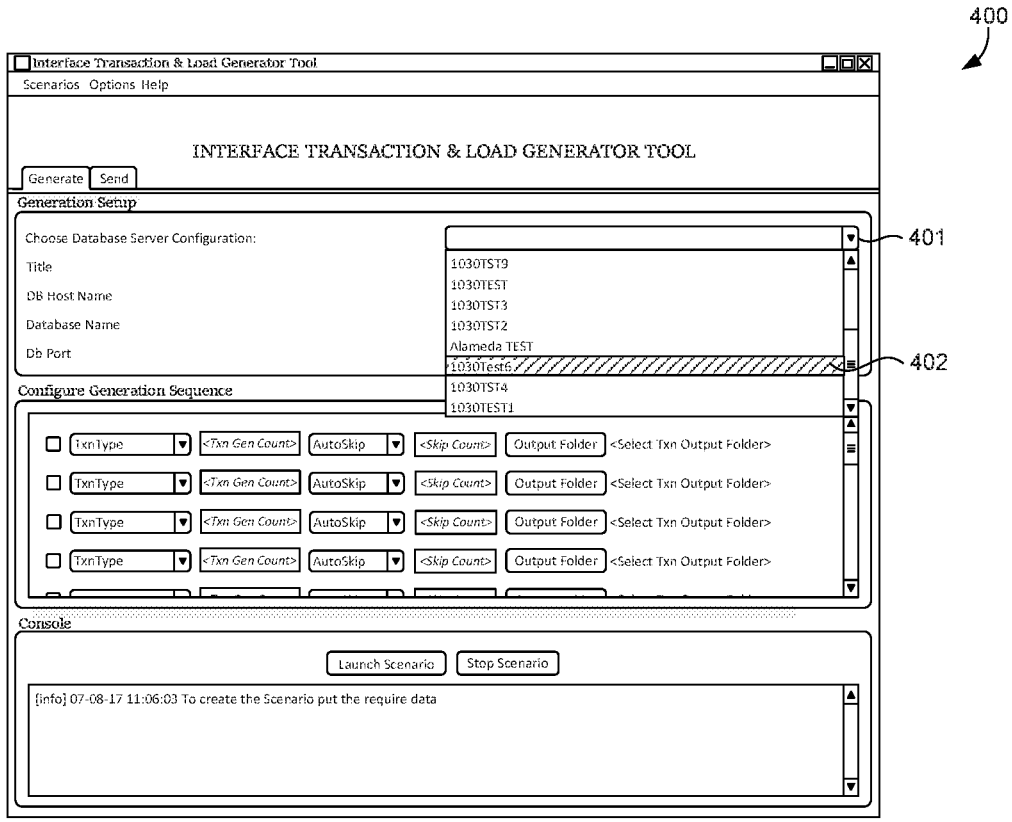
FIG. 4 depicts an exemplary graphical user interface (GUI), in accordance with aspects described herein.

The generator 202 is initialized as shown in FIG. 3. FIG. 3 provides a GUI 300 where a new scenario for testing has been selected. The GUI 300 includes a generate tab 301 (initiates the HL7 generator portion of the generator 202) and a send tab 302 (initiates the load generator portion of the generator 202). Initially, a user can select a database server configuration at database server configuration drop-down 303. The additional information shown (i.e., title, database host name, database name, database port, etc.) is pre-populated based on the database server configuration selection made at the database server configuration drop-down 303. New configurations may also be input into the tool and database connectivity may be validated. Selection of the environment is illustrated in FIG. 4 by GUI 400 where a server configuration drop-down 401 has been selected and an environment selection 402 is highlighted.

Figure 5:
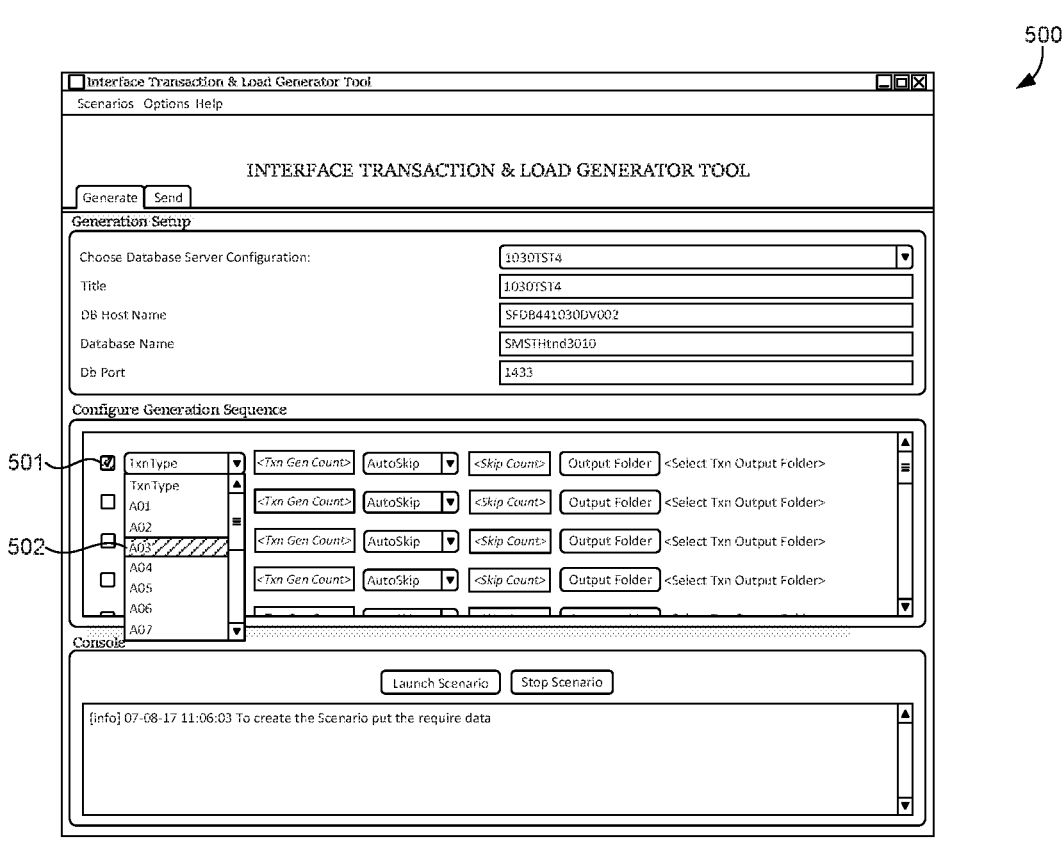
FIG. 5 depicts an exemplary graphical user interface (GUI), in accordance with aspects described herein.

A generation sequence area 305 includes several criteria for generating HL7 messages. The criteria includes identifier indicator 306 where an identifier type or event trigger is identified. This may allow for a user to select identifier type A01, for instance, or any other identifier type of an HL7 message. Selection of the identifier type is illustrated in GUI 500 of FIG. 5 where an identifier indicator 306 is selected such that a drop down of possible identifier types is presented. As is shown in FIG. 5, the possible identifier types listed in the shown portion (other options are available using a scroll down feature) include A01, A02, A03 (currently highlighted by indication 502), A04, A05, A06, and A07. The identifier types may be sequentially listed, as shown, or may be listed based on frequency of use for a particular user and/or system to test.

The criteria further includes a count indicator 307 where a total number of HL7 messages having the identifier type indicator indicated by identifier indicator 306. Any number of HL7 messages may be generated. The size of the database 201 is the only limiting factor as to the number of HL7 messages that can be generated. A count selection is indicated in GUI 600 of FIG. 6. Here, identifier type A01 has been selected as shown by identifier indicator 601 and a count of 100,000 messages is indicated at count indicator 602. Further, identifier type A03 has been selected as shown by identifier indicator 603 and a count of 100 messages is indicated at count indicator 604.

Figure 6:
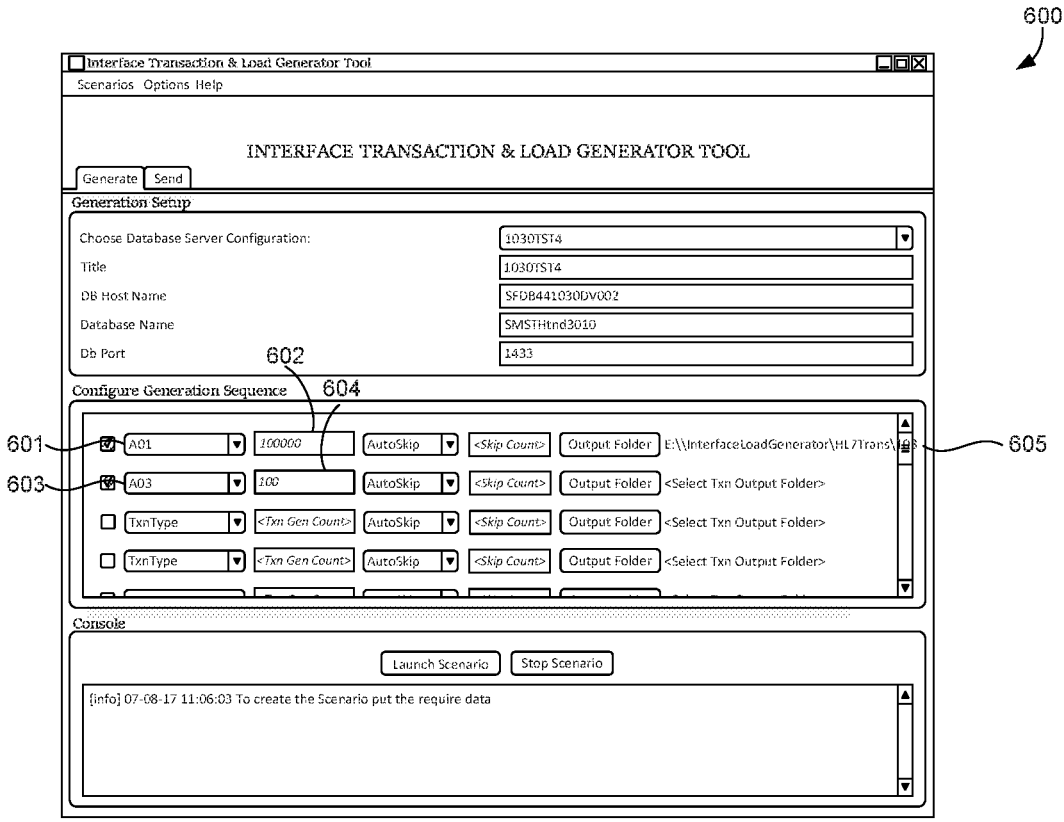
FIG. 6 depicts an exemplary graphical user interface (GUI), in accordance with aspects described herein.
Figure 7:
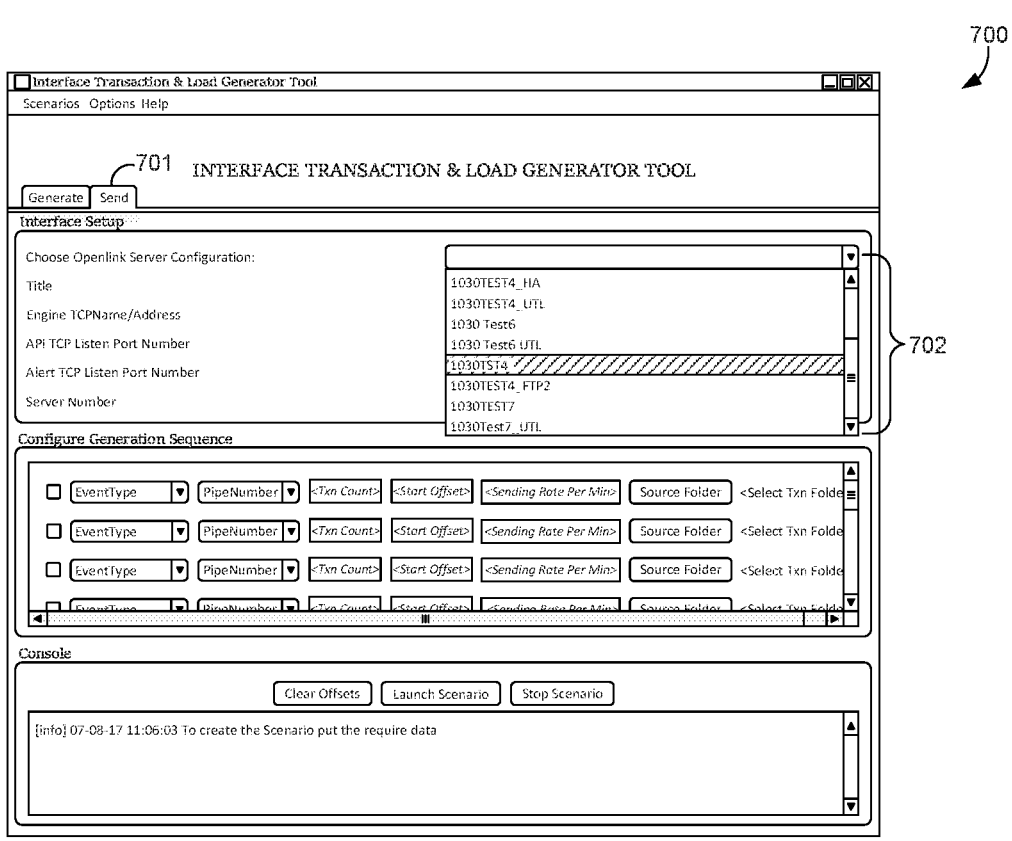
FIG. 7 depicts an exemplary graphical user interface (GUI), in accordance with aspects described herein.

Criteria further includes an output folder indicator 308 and an output folder selection area 309. When the HL7 messages are generated, they need to be stored somewhere such that the generator 202 can later access the generated test messages for, for example, testing. The test HL7 messages may be stored in database 201, for example, or any other storage. FIG. 6 also illustrates a selected output folder at indicator 605. One would choose the "launch scenario" indicator in FIG. 6 to generate the plurality of HL7 messages in accordance with the specifications indicated in FIG. 6.

Once the transactions are generated, they need to be sent in order to actually test the system. To switch from the HL7 generator to the load generator of the generator 202, one selects the send tab 701 shown in GUI 700 of FIG. 7. An OPENLink® server configuration is selected at configuration area 702. These OPENLink® server configurations are pre-populated. This identifies one or more of the OPEN-Link® servers used to transmit the HL7 messages to the test interface 204, the test interface environment to receive the messages, and the like. The test interface 204 is any interface used to test inbound message performance. In this mode, new configurations may also be populated and the intermediary agent's connectivity may be validated.

Figure 8:
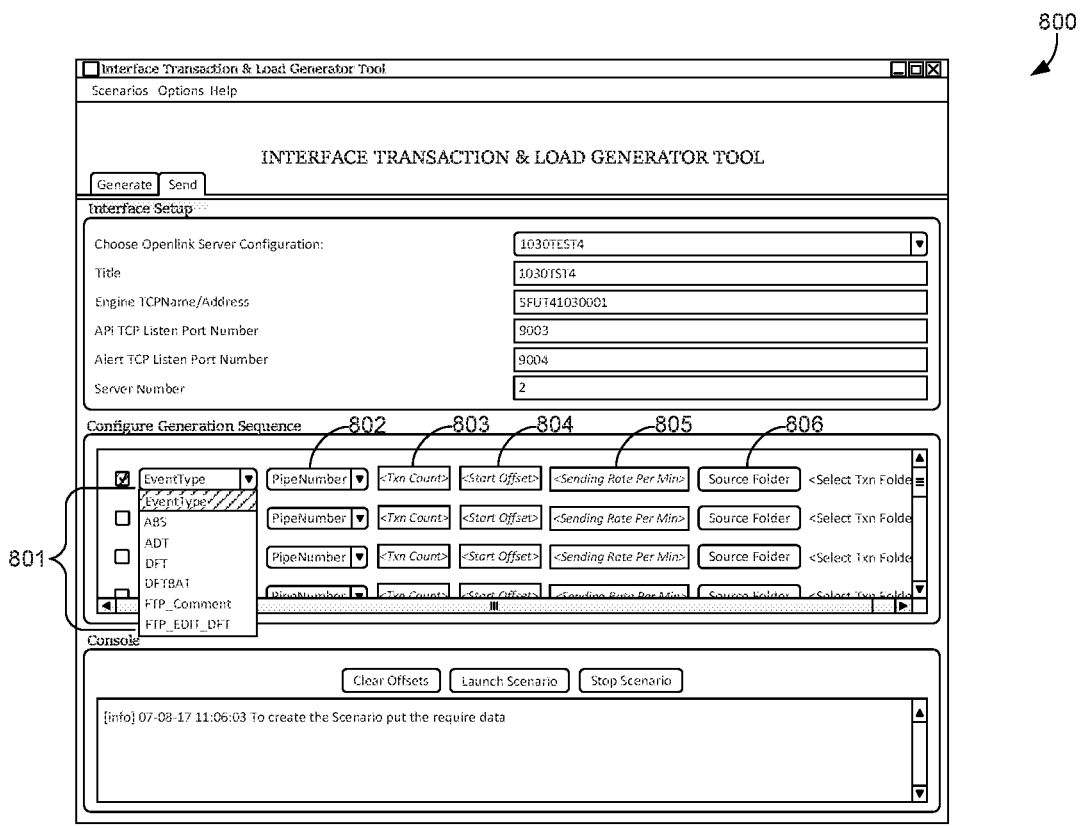
FIG. 8 depicts an exemplary graphical user interface (GUI), in accordance with aspects described herein.
Figure 9:
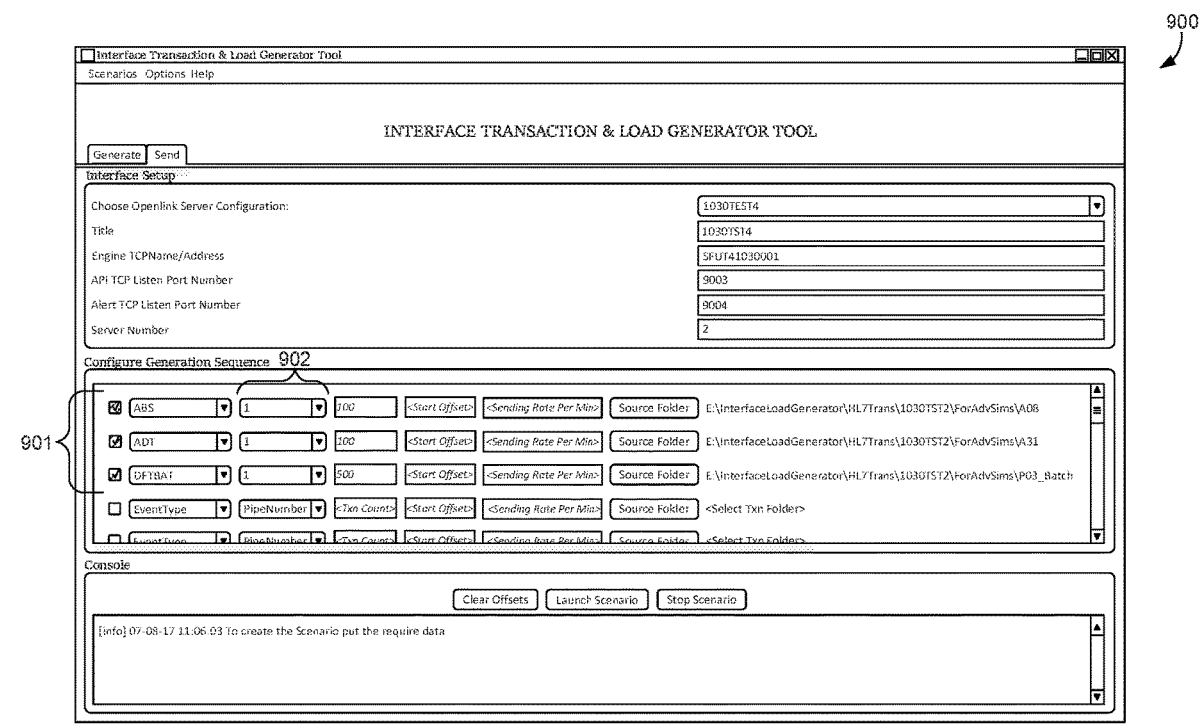
FIG. 9 depicts an exemplary graphical user interface (GUI), in accordance with aspects described herein.

To send the test HL7 messages, a message type is selected from message type selection drop-down 801 of GUI 800 shown in FIG. 8. As shown, exemplary message types include, in this exemplary GUI, ABS, ADT, DFT, DFTBAT, FTP_Comment, and FTP_EDIT_DFT. This is not meant to limit the invention to only the above-listed message types but, rather, to provide an exemplary listing of message types used in inbound testing. FUI 800 also includes a pipe number indicator 802, which indicates a pipe to utilize to transmit the identified HL7 messages. For example, ABS message type may be selected from the message type selection drop-down 801 and pipe 1 (of a plurality of pipes) may be selected to transmit those messages, while pipe 2 may be selected to transmit another set of messages indicated as a different message type (or the same ABS message type as indicated for the first set of messages). This is illustrated in GUI 900 of FIG. 9 where several message types have been selected in area 901 and the pipes have all been designated as pipe 1 in pipe number indicator area 902. As noted, multiple pipes may be used at the same time so each of the designated pipes could easily be different from one another and still allow for simultaneous transmission of the HL7 messages.

As with the HL7 generator portion of the tool, a count indicator 803 is provided where a user can indicate a value of how many HL7 messages of the message type indicated should be transmitted. Additionally, the generator 202 offers the option to offset the values in offset area 804. Turning to GUI 1000 of FIG. 10, an offset illustration is provided. As shown, a count of 6 has been designated in count area 1001, while an offset value 2 has been indicated at offset area 1002. This allows configuration of a start point for transmission. In other words, six messages will still be sent in this example, but it won't be the first six messages. Instead, the first two messages will be skipped (or offset) and the next six messages are sent.

Figure 10:
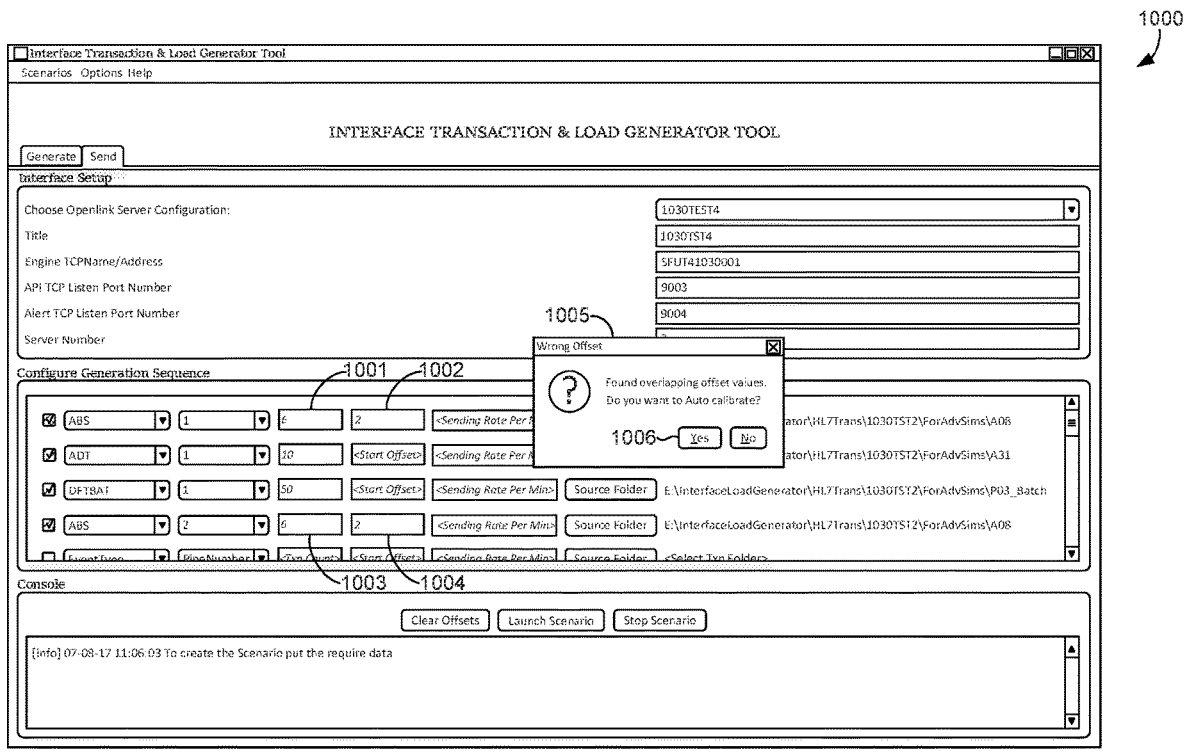
FIG. 10 depicts an exemplary graphical user interface (GUI), in accordance with aspects described herein.

The generator 202 moderates for overlapping offset values, as shown in FIG. 10. As indicated, a total number of 6 messages has been indicated at indicator 1003 with an offset value of 2 at indicator 1004—the same count and offset value as provided with indicators 1001 and 1002. In this instance, the generator 202 provides a warning 1005 that the offset values overlap. A user can select to auto-calibrate by selecting auto-calibrate confirmation button 1006 and the generator 202 will automatically adjust the offset value as shown in GUI 1100 of FIG. 11, where the offset value of 2 at indicator 1004 (FIG. 10) has been updated/auto-calibrated to 8 at indicator 1101. Since the first instruction provides for skipping the first two messages and then sending six, the generator 202 identifies that the first eight messages have been addressed and auto-calibrates the load generator to skip the first eight messages and then send six, as indicated.

Figure 11:
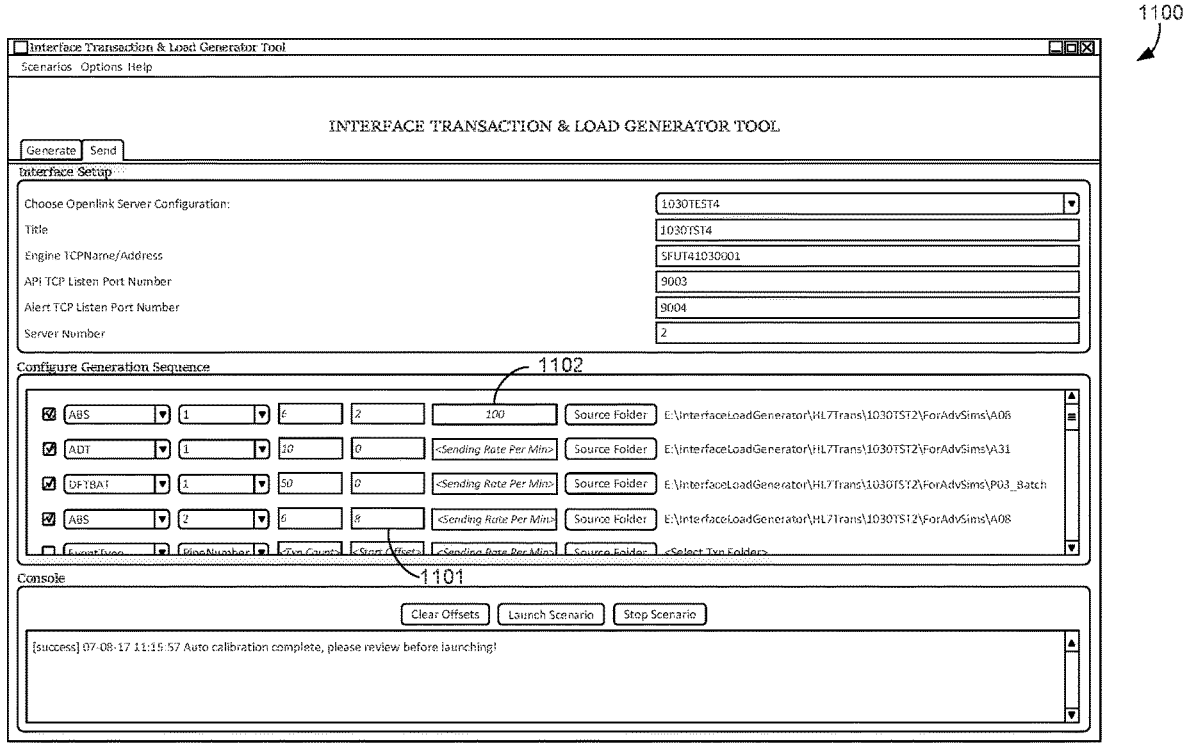
FIG. 11 depicts an exemplary graphical user interface (GUI), in accordance with aspects described herein.

Returning to FIG. 8, the load generator also allows for adjustment of a rate per minute value. For example, if one knows that 100 transactions hit a system per minute, it will be more realistic to test that value than bombarding the system with 10,000 transactions at one time. This is illustrated in FIG. 11 at rate/min value 1102.

Finally, FIG. 8 includes a source folder indicator 806. The source is based on standards. For instance, ABS message types are correlated with an A08 source (see source listed in FIG. 9 for each message type). ADT may be correlated with several sources including A31, A03, and the like. All charge event triggers (start with "p" instead of "A") are sources for DFT or DFTBAT message types. This indicates the source folder from which the test HL7 transaction messages are accessed. The scenario may be launched once the information provided above is provided.

Figure 12:
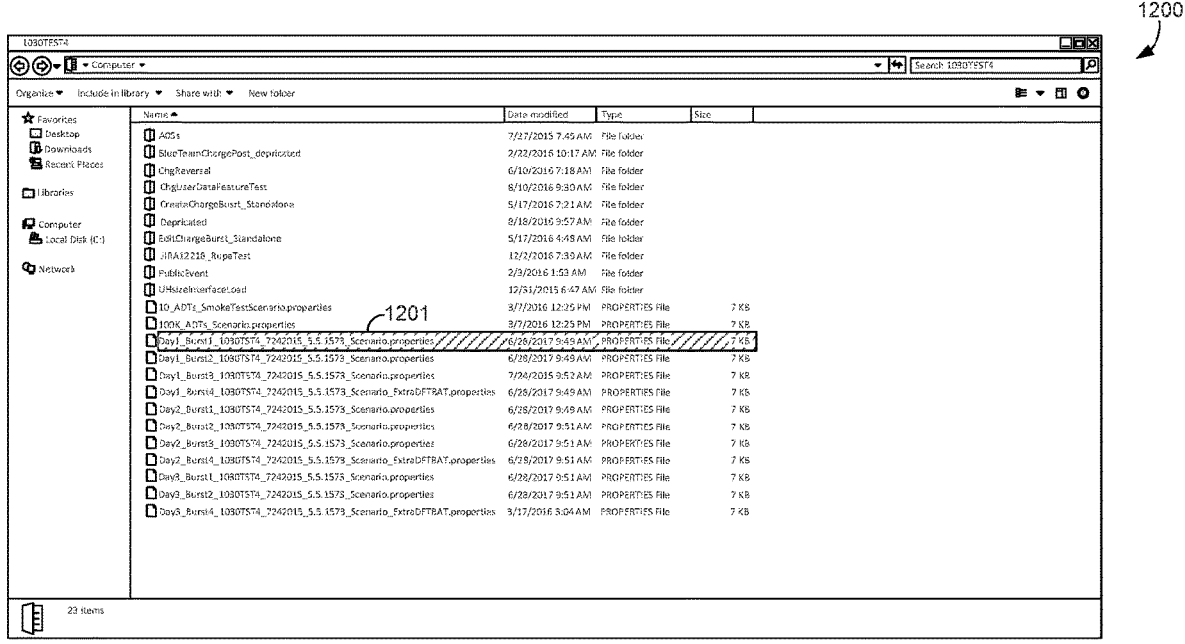
FIG. 12 depicts an exemplary graphical user interface (GUI), in accordance with aspects described herein.
Figure 13:
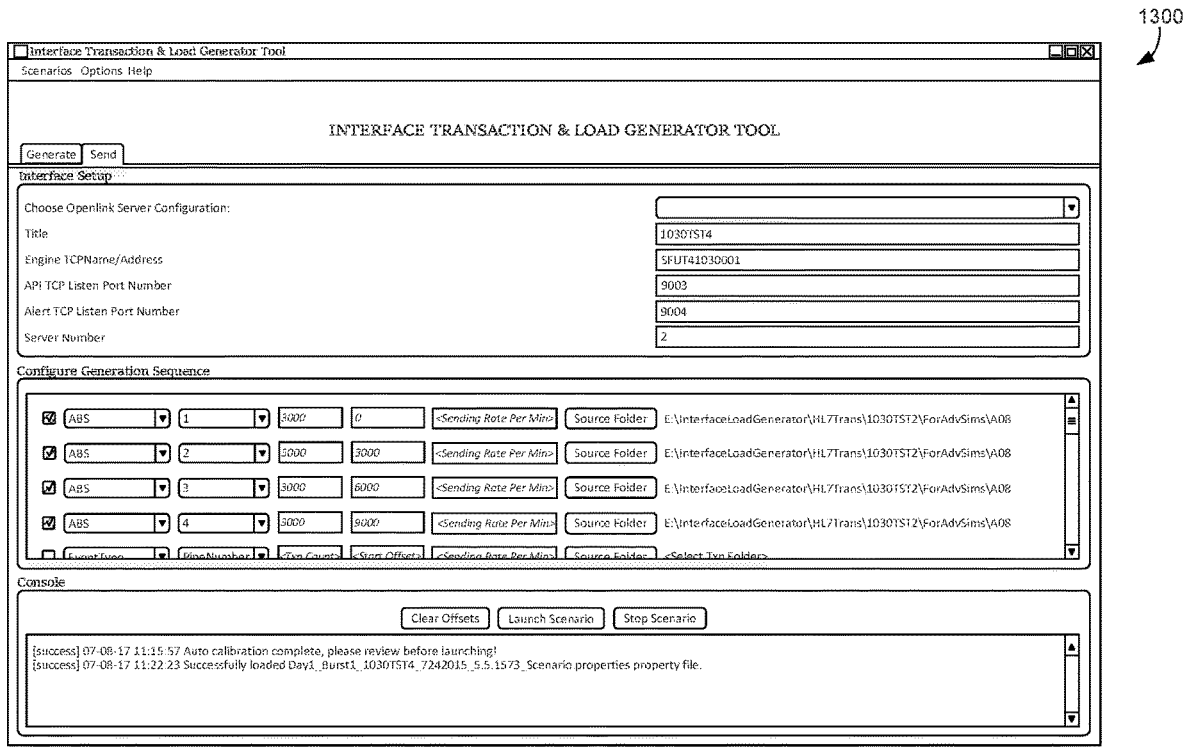
FIG. 13 depicts an exemplary graphical user interface (GUI), in accordance with aspects described herein.
Figure 14:
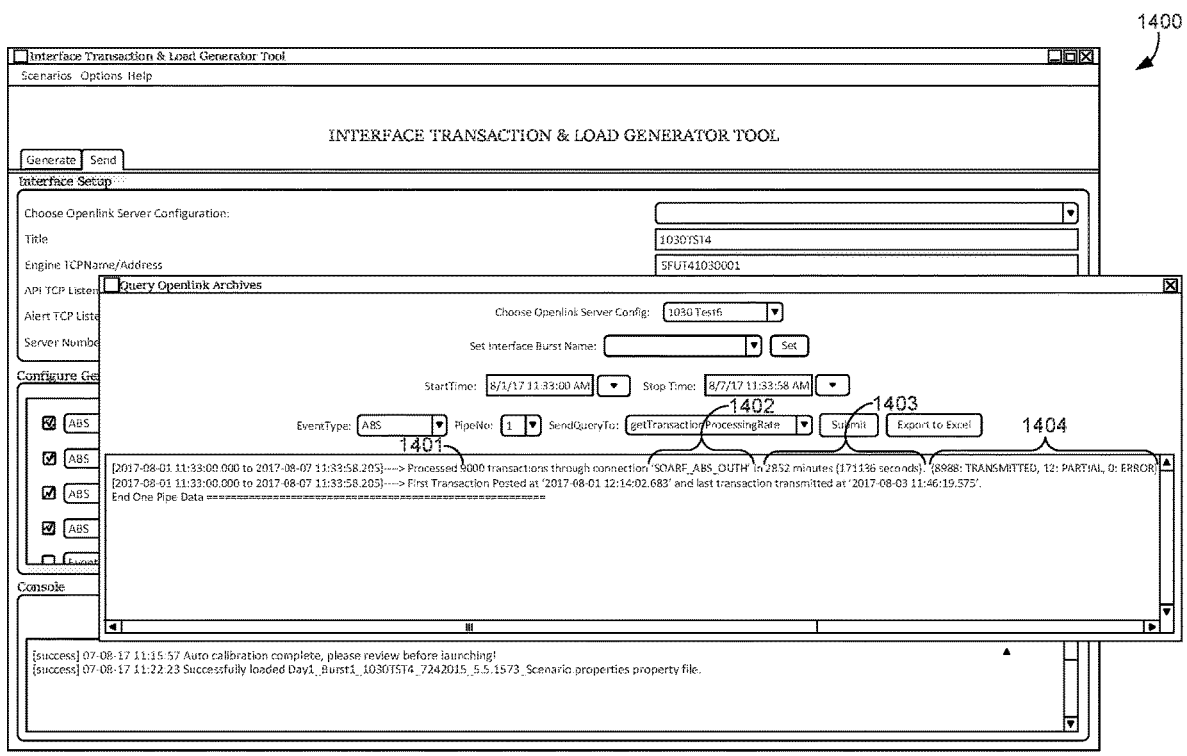
FIG. 14 depicts an exemplary graphical user interface (GUI), in accordance with aspects described herein.

Alternatively, instead of generating scenarios each time, the generator 202 provides a function to save scenarios for future use. The saved scenarios may be saved, for instance, at database 201. An exemplary save interface 1200 is provided in FIG. 12, showing a saved burst selected at selector 1201. Once selected, the burst is populated in the generator 202, as shown in GUI 1300 of FIG. 13. The saved scenario may then be launched.

Launching the scenario causes transmission of the test HL7 messages to the intermediary agent 203. The intermediary agent 203, in an aspect herein is OPENLink® configured to translate HL7 to a format compatible with the test interface 204. However, any intermediary agent for transmission may be used. Additionally, in environments where the test interface 204 is compatible with HL7 format, no intermediary agent is required. In that situation, the generator 202 will launch the scenario and transmit the test HL7 messages directly to the test interface 204, without any intermediate components. The intermediary agent 203 is provided herein to illustrate an ability to utilize the present generator 202 with systems that are not compatible with HL7 format, or any originating test message format.

When transmitted to the intermediary agent 203, the intermediary agent 203 translates the received test HL7 messages into a format compatible with the test interface 204. An exemplary compatible format is XML. The HL7 messages may then be transmitted to the test interface 204 by the generator 202 (through the intermediary agent 203), by the intermediary agent 203 (utilizing transmission instructions from the generator 202), or by the generator 202 directly to the test interface 204 (after receiving translated HL7 messages back from the intermediary agent 203.

Once transmitted, the generator 202 may receive results data outlining performance of processing of the test HL7 transaction messages by the test interface 204. Exemplary results data is provided in GUI 1400 of FIG. 14. The results data indicates a number of messages processed at indicator 1401, the test inbound interface tested at indicator 1402, and the amount of time it took to process the transactions at indicator 1403. Indicator 1404 provides details regarding the total number processed included how many were completely processed with no errors, how many were partially processed, and how many received an error. As shown here, of the 9000 processed, 8988 were completed, 12 were partially processed, and 0 encountered errors.

Aspects described herein provide a tool with the capability to access data, across clients, to generate a large volume of test HL7 transaction messages that can be a plurality of identifier types and a plurality of message types, and can be transmitted via different pipes at the same time. As mentioned, the tool can access patient information (e.g., Encounter ID, patient name, age, health provider, etc.) and then add random data (e.g., email, phone number, address, insurance, etc.) to preserve the confidential nature of the content. In an aspect, the tool may recognize that a portion of an HL7 message does not contain confidential information, such as the MSH header described herein. An MSH header including the sought-after identifier type and/or message type is identified and other portions of the HL7 message are removed and replaced with randomly selected data from other HL7 messages not paired with the currently selected HL7 message.

It will be appreciated by those having ordinary skill in the art that the exemplary embodiments discussed above may be implemented using hardware, software, memory, processor(s), and/or computer device(s) in a centralized and/or distributed computing environment. The embodiments of the present invention may further be implemented through a web browser or an application programming interface (API), for example, accessible by users through graphical user interfaces (GUI), as also previously discussed.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A computerized method comprising:
   in a generation mode of a first application:
      accessing a client information source for generating test Health Level 7 (HL7) transaction messages;
      generating a plurality of test HL7 transaction messages, wherein generating the plurality of test HL7 transaction messages comprises:
         identifying a first identifier type for a first set of test HL7 transaction messages; and
         identifying a second identifier type for a second set of test HL7 transaction messages;
      outputting the first set of test HL7 transaction messages to a first destination; and
      outputting the second set of test HL7 transaction messages to a second destination;
   in a load testing mode of the application:
      identifying a first message type of a first plurality of test HL7 transaction messages from the first set of test HL7 transaction messages for communication to an intermediate agent via a first pipe;

identifying a second message type of a second plurality of test HL7 transaction messages from the second set of test HL7 transaction messages for communication to the intermediate agent via a second pipe;

transmitting each of the first plurality of test HL7 transaction messages and the second plurality of test HL7 transaction messages to the intermediate agent for translation to a format compatible with an inbound testing interface; and receiving result data from the inbound testing interface indicating processing performance of the inbound testing interface, wherein the processing performance indicates a number of HL7 transaction messages processed and an error rate within the number of HL7 transaction messages processed.

2. The computerized method of claim 1, further comprising indicating transmission instructions for transmission from the intermediate agent to the inbound testing interface.

3. The computerized method of claim 2, further comprising identifying a customized rate per minute within the transmission instructions to transmit each of the first plurality of test HL7 transactions messages and the second plurality of test HL7 transaction messages to the inbound testing interface.

4. The computerized method of claim 1, wherein the first destination and the second destination are output folders to store generated test HL7 transaction messages for use by the load testing mode of the application.

5. The computerized method of claim 4, wherein the first destination is different from the second destination, and wherein the first destination is associated with a first identifier type and the second destination is associated with the second identifier type.

6. The computerized method of claim 1, wherein each of the first identifier type and the second identifier type is one of HL7 transaction type A01-A51.

7. The computerized method of claim 1, wherein each of the first message type and the second message type is one of HL7 message types (i) Admission Discharge Transfer type (ADT) or (ii) Detailed Financial Transaction type (DFT).

8. One or more non-transitory computer-readable media having computer-executable instructions embodied thereon that, when executed, perform a method comprising:

in a generation mode of a first application:

accessing a client information source for generating test Health Level 7 (HL7) transaction messages;

generating a plurality of test HL7 transaction messages, wherein generating the plurality of test HL7 transaction messages comprises:

identifying a first identifier type for a first set of test HL7 transaction messages; and identifying a second identifier type for a second set of test HL7 transaction messages;

outputting the first set of test HL7 transaction messages to a first destination; and outputting the second set of test HL7 transaction messages to a second destination;

in a load testing mode of the application:

identifying a first message type of a first plurality of test HL7 transaction messages from the first set of test HL7 transaction messages for communication to an intermediate agent via a first pipe;

identifying a second message type of a second plurality of test HL7 transaction messages from the second set of test HL7 transaction messages for communication to the intermediate agent via a second pipe;

transmitting each of the first plurality of test HL7 transaction messages and the second plurality of test HL7 transaction messages to the intermediate agent for translation to a format compatible with an inbound testing interface; and receiving result data from the inbound testing interface indicating processing performance of the inbound testing interface, wherein the processing performance indicates a number of HL7 transaction messages processed and an error rate within the number of HL7 transaction messages processed.

9. The media of claim 8, further comprising indicating transmission instructions for transmission from the intermediate agent to the inbound testing interface.

10. The media of claim 9, further comprising identifying a customized rate per minute within the transmission instructions to transmit each of the first plurality of test HL7 transactions messages and the second plurality of test HL7 transaction messages to the inbound testing interface.

11. The media of claim 8, wherein each of the first message type and the second message type is one of HL7 message types (i) Admission Discharge Transfer type (ADT) or (ii) Detailed Financial Transaction type (DFT).

12. The media of claim 8, wherein each of the first identifier type and the second identifier type is one of HL7 transaction type A01-A51.

13. The media of claim 12, wherein the first identifier type is different from the second identifier type.

14. One or more non-transitory computer-readable media having computer-executable instructions embodied thereon that, when executed, perform a method comprising:

generating a plurality of test HL7 transaction messages, wherein the plurality of test HL7 transaction messages includes at least a first identifier type and a second identifier type, wherein the first identifier type and the second identifier type are different from one another;

outputting a first plurality of test HL7 transaction messages to a first destination associated with the first identifier type;

outputting a second plurality of test HL7 transaction messages to a second destination associated with the second identifier type;

identifying a message type of each test HL7 transaction message of the first plurality of test HL7 transaction messages and the second plurality of test HL7 transaction messages for communication to an intermediate agent;

transmitting each of the first plurality of test HL7 transaction messages a via a first pipe and the second plurality of test HL7 transaction messages via a second pipe to an intermediate agent for translation to a format compatible with an inbound testing interface; and receiving result data from the inbound testing interface indicating processing performance of the inbound testing interface, wherein the processing performance indicates a number of HL7 transaction messages processed and an error rate within the number of HL7 transaction messages processed.

15. The media of claim 14, wherein each of the first identifier type and the second identifier type is one of HL7 transaction type A01-A04.

16. The media of claim 14, wherein each of the first message type and the second message type is one of HL7 message types (i) Admission Discharge Transfer type (ADT) or (ii) Detailed Financial Transaction type (DFT).

17. The media of claim 14, wherein the method further comprises indicating transmission instructions for transmission from the intermediate agent to the inbound testing interface.

18. The media of claim 17, wherein the transmission instructions include a rate per minute value for transmission to the inbound testing interface.

19. The media of claim 14, wherein the method further comprises:
   indicating an offset value for transmission to the inbound testing interface,
   wherein the offset value indicates a transmission start point.

20. The media of claim 14, wherein the method further comprises saving the transmission.

* * * * *